US008559682B2

(12) United States Patent
Zhang et al.

(10) Patent No.: US 8,559,682 B2
(45) Date of Patent: Oct. 15, 2013

(54) BUILDING A PERSON PROFILE DATABASE

(75) Inventors: Lei Zhang, Beijing (CN); Xin-Jing Wang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 12/942,284

(22) Filed: Nov. 9, 2010

(65) Prior Publication Data

US 2012/0114197 A1  May 10, 2012

(51) Int. Cl.
G06K 9/00 (2006.01)
G06K 9/54 (2006.01)

(52) U.S. Cl.
USPC .......................................... 382/118; 382/305

(58) Field of Classification Search
USPC .......... 382/118, 159, 190, 209, 218, 224, 305
See application file for complete search history.

(56) References Cited

U.S. PATENT DOCUMENTS

| | | |
|---|---|---|
| 5,852,823 A | 12/1998 | De Bonet |
| 5,893,095 A | 4/1999 | Jain et al. |
| 5,913,205 A | 6/1999 | Jain et al. |
| 6,128,446 A | 10/2000 | Schrock et al. |
| 6,397,213 B1 | 5/2002 | Cullen et al. |
| 6,480,841 B1 | 11/2002 | Higashio et al. |
| 6,523,026 B1 | 2/2003 | Gillis |
| 6,523,062 B1 | 2/2003 | Bridgman et al. |
| 6,804,659 B1 | 10/2004 | Graham et al. |
| 6,804,684 B2 | 10/2004 | Stubler et al. |
| 6,970,860 B1 | 11/2005 | Liu et al. |
| 7,010,751 B2 | 3/2006 | Shneiderman |
| 7,099,860 B1 | 8/2006 | Liu et al. |
| 7,624,337 B2 | 11/2009 | Sull et al. |
| 7,739,304 B2 | 6/2010 | Naaman et al. |
| 7,961,986 B1 | 6/2011 | Jing et al. |
| 7,971,150 B2 | 6/2011 | Raskutti et al. |
| 8,023,702 B2* | 9/2011 | Momosaki et al. ........... 382/118 |
| 8,208,764 B2* | 6/2012 | Guckenberger .............. 382/305 |
| 8,234,277 B2 | 7/2012 | Thong et al. |
| 8,391,618 B1 | 3/2013 | Chuang et al. |
| 8,442,940 B1 | 5/2013 | Faletti et al. |
| 2002/0038299 A1 | 3/2002 | Zernik et al. |
| 2002/0087538 A1 | 7/2002 | Abdel-Mottaleb et al. |

(Continued)

FOREIGN PATENT DOCUMENTS

EP  1304625  4/2003
JP  1196176  4/1999

(Continued)

OTHER PUBLICATIONS

The Chinese Office Action mailed Mar. 20, 2012 for Chinese patent application No. 200780017842.6, a counterpart foreign application of U.S. Appl. No. 11/419,368, 8 pages.

(Continued)

*Primary Examiner* — Daniel Mariam
(74) *Attorney, Agent, or Firm* — Lee & Hayes, PLLC

(57) ABSTRACT

Names of entities, such as people, in an image may be identified automatically. Visually similar images of entities are retrieved, including text proximate to the visually similar images. The collected text is mined for names of entities, and the detected names are analyzed. A name may be associated with the entity in the image, based on the analysis.

20 Claims, 4 Drawing Sheets

(56) References Cited

U.S. PATENT DOCUMENTS

| | | | |
|---|---|---|---|
| 2002/0138478 A1 | 9/2002 | Schwartz et al. | |
| 2002/0184196 A1 | 12/2002 | Lehmeier et al. | |
| 2002/0188602 A1 | 12/2002 | Stubler et al. | |
| 2003/0018631 A1 | 1/2003 | Lipson et al. | |
| 2003/0195883 A1 | 10/2003 | Mojsilovic et al. | |
| 2004/0003351 A1 | 1/2004 | Sommerer et al. | |
| 2004/0021780 A1 | 2/2004 | Kogan | |
| 2004/0070678 A1 | 4/2004 | Toyama et al. | |
| 2004/0213553 A1 | 10/2004 | Nagahashi | |
| 2004/0225686 A1 | 11/2004 | Li et al. | |
| 2005/0010602 A1 | 1/2005 | Loui et al. | |
| 2005/0114325 A1 | 5/2005 | Liu et al. | |
| 2005/0210393 A1 | 9/2005 | Maeng | |
| 2005/0228657 A1 | 10/2005 | Chou et al. | |
| 2005/0278379 A1 | 12/2005 | Nakazawa | |
| 2006/0143176 A1 | 6/2006 | Mojsilovic et al. | |
| 2006/0179453 A1 | 8/2006 | Kadie et al. | |
| 2006/0264209 A1 | 11/2006 | Atkinson et al. | |
| 2007/0005571 A1 | 1/2007 | Brewer et al. | |
| 2007/0038601 A1 | 2/2007 | Guha | |
| 2007/0061146 A1 | 3/2007 | Jaramillo et al. | |
| 2007/0106685 A1 | 5/2007 | Houh et al. | |
| 2007/0112844 A1 | 5/2007 | Tribble et al. | |
| 2007/0160275 A1 | 7/2007 | Sathyanarayana | |
| 2007/0240060 A1 | 10/2007 | Berenbach et al. | |
| 2007/0255618 A1 | 11/2007 | Meerbergen et al. | |
| 2007/0266001 A1 | 11/2007 | Williams et al. | |
| 2007/0271226 A1 | 11/2007 | Zhang et al. | |
| 2007/0288453 A1 | 12/2007 | Podilchuk | |
| 2008/0004953 A1 | 1/2008 | Ma et al. | |
| 2008/0235724 A1 | 9/2008 | Sassenscheidt et al. | |
| 2008/0319844 A1 | 12/2008 | Hua et al. | |
| 2009/0144609 A1* | 6/2009 | Liang et al. | 715/230 |
| 2009/0187825 A1 | 7/2009 | Sandquist et al. | |
| 2009/0196464 A1* | 8/2009 | Dimitrova et al. | 382/118 |
| 2009/0196510 A1 | 8/2009 | Gokturk et al. | |
| 2009/0208097 A1 | 8/2009 | Husseini et al. | |
| 2009/0249185 A1 | 10/2009 | Datar et al. | |
| 2009/0300475 A1 | 12/2009 | Fink et al. | |
| 2009/0313239 A1 | 12/2009 | Wen et al. | |
| 2009/0319883 A1 | 12/2009 | Mei et al. | |
| 2010/0057694 A1 | 3/2010 | Kunjithapatham et al. | |
| 2010/0076923 A1 | 3/2010 | Hua et al. | |
| 2010/0076968 A1 | 3/2010 | Boyns et al. | |
| 2010/0205202 A1 | 8/2010 | Yang et al. | |
| 2010/0260426 A1 | 10/2010 | Huang et al. | |
| 2010/0293174 A1 | 11/2010 | Bennett et al. | |
| 2011/0038512 A1* | 2/2011 | Petrou et al. | 382/118 |
| 2011/0085739 A1 | 4/2011 | Zhang et al. | |
| 2011/0116690 A1* | 5/2011 | Ross et al. | 382/118 |
| 2011/0123115 A1* | 5/2011 | Lee et al. | 382/185 |
| 2011/0173141 A1 | 7/2011 | Campbell et al. | |

FOREIGN PATENT DOCUMENTS

| | | |
|---|---|---|
| JP | 2003186889 | 7/2003 |
| JP | 2004234228 | 8/2004 |
| JP | 2005011079 | 1/2005 |
| JP | 2005352782 | 12/2005 |
| KR | 20040054901 | 6/2004 |
| RU | 2193797 | 11/2002 |
| WO | WO2005008519 | 1/2005 |
| WO | WO2006002745 | 1/2006 |

OTHER PUBLICATIONS

Translated the Japanese Office Action mailed May 25, 2012 for Japanese patent application No. 2009-511113, a counterpart foreign application of U.S. Appl. No. 11/419,368, 8 pages.

Office Action for U.S. Appl. No. 12/563,955, mailed on Mar. 15, 2012, Xin-Jing Wang, "Interest Learning from an Image Collection for Advertising", 23 pgs.

Office Action for U.S. Appl. No. 12/790,761, mailed on Mar. 20, 2012, Motaz Ahmed Ei-Saban, "Real-Time Annotation and Enrichment of Captured Video", 15 pgs.

Office action for U.S. Appl. No. 12/790,772, mailed on May 24, 2012, Wang et al., "Associating Media With Metadata of Near-Duplicates", 12 pages.

The Chinese Office Action mailed Oct. 17, 2012 for Chinese patent application No. 200780017842.6, a counterpart foreign application of U.S. Appl. No. 11/419,368, 8 pages.

Office action for U.S. Appl. No. 13/110,282, mailed on Nov. 9, 2012, Wang et al., "Text to Image Translation", 20 pages.

U.S. Appl. No. 13/110,282; "Text to Image Translation" Wang, et al., filed May 18, 2011, 46 pages.

Office Action for U.S. Appl. No. 12/563,955, mailed on Oct. 13, 2011, Xin-Jing Wang, "Interest Learning from an Image Collection for Advertising", 22 pgs.

bing.com, Maps, Retrieved on Dec. 28, 2009 at <<http://cn.bing.com/ditu/>>, 2 pgs.

Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.

Chang, Lin, "LIBSVM: a Library for Support Vector Machines", retrieved on Apr. 12, 2010 at <<http:// http://www.csie.ntu.edu.tw/~cjlin/papers/libsvm.pdf>>, National Taiwan University Technical Report, Computer Science and Information Engineering, 2001-2004, pp. 1-30.(software available at http://www.csie.ntu.edu.tw/~cjlin/libsvm).

Classification and Retrieval of Images—Published Date: Sep. 17, 2010 http://claret.wikidot.com/ 3 pages.

Fergus et al., "A Visual Category Filter for Google Images," Computer Vision—\ ECCV, 2004, Lecture Notes in Computer Science, 2004, vol. 3021/2004, 14 pages.

"Google Sets", retrieved on Dec. 15, 2008 at <<http://labs.google.com/sets>>, Google, 1 page.

Hua, et al. "Internet Multimedia Search and Mining"—Published date: Jan. 27, 2010 http://research.microsoft.com/en-us/um/people/xshua/imsm/ebook/pdf/16.pdf, 30 pages.

Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.

Kennedy, et al., "Generating Diverse and Representative Image Search Results for Landmarks", ACM, Proceedings of International Conference on World Wide Web (WWW), Beijing, CN, Apr. 2008, pp. 297-306.

Li, J., "Automatic Linguistic Indexing of Pictures by a Statistical Modeling Approach" IEEE Transactions on Pattern Analysis and Machine Intelligence, 25(9):1075-1088, 2003.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Miller, "Wordnet: an on-line lexical database" International Journal of Lexicography, pp. 39-41, 1990.

Noah, et al. "Binding Semantic to a Sketch Based Query Specification Tool"—Published Date: Apr. 2009 http://www.ccis2k.org/iajit/PDF/vol.6,no.2/2BSSBOST116.pdf, 8 pages.

Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.

Picasa 3, retrived at http://picasa.google.com/ on Aug. 4, 2009, 1 pg.

The Russian Office Action mailed Mar. 25, 2011 for Russian Patent Application No. 2008145584, a counterpart foreign application of U.S. Appl. No. 11/419,368.

Strong, et al., "Organizing and Browsing Image Search Results based on Conceptual and Visual Similarities" Retrieved Date: Jan. 5, 2011 http://www.cs.mun.ca/~hoeber/download/2010_isvc_vibe_concept.pdf, 10 pages.

(56) References Cited

OTHER PUBLICATIONS

Wnuk, et al. "Filtering Internet Image Search Results Towards Keyword Based Category Recognition" Retrieved Date: Jan. 5, 2011 http://vision.ucla.edu/papers/wnukS08.pdf, 8 pages.
Yang, et al., "A Comparative Study on Feature Selection in Text Categorization", Proceedings of the Fourteenth International Conference on Machine Learning, 1997, pp. 412-420 (9 pgs.).
Badi, "Recognition and Representation of User Interest", Master Thesis, Texas A&M University, Dec. 2005, 72 pgs.
Barnard, et al., "Matching Words and Pictures", retrieved on Apr. 16, 2010 at http://www.cs.princeton.edu/18 blei/papers/Barnard-DuyguluFreitasForsythBleiJordan2003.pdf>>, JMLR.org, Journal of Machine Learning Research, vol. 3, Mar. 2003, pp. 1107-1135.
Batra, et al., "Cutout-Search: Putting a Name to the Picture", retrieved on Aug. 2, 2010 at <<http://chenlab.ece.cornell.edu/people/adarsh/publications/cvpr_iv_2009.pdf>>, IEEE Computer Society, Proceedings of Workshop on Computer Vision and Pattern Recognition (CVPR), Miami, Florida, Jun. 2009, pp. 23-30.
"Become an Online Image Detective with TinEye (groovyReview)", retrieved on Aug. 3, 2010 at http://www.groovypost.com/howto/groovyreview/become-online-image-detective-tineye-review/>>, groovyPost.com, Jan. 18 2010, pp. 1-11.
Broder, A. et al., "A Semantic Approach to Contextual Advertising", SIGIR, pp. 559-566, 2007.
Carneiro, et al., "Supervised Learning of Semantic Classes for Image Annotation and Retrieval", retrieved on Apr. 16, 2010 at <<http://citeseerx.ist.psu.edu/viewdoc/download?doi=10.1.1.88.3490&rep=rep1&type=pdf>>, IEEE Computer Society, Transactions on Pattern Analysis and Machine Intelligence, vol. 29, No. 3, Mar. 2007, pp. 394-410.
Chen, et al, "Advertising Keywork Suggesiton Based on Concept Hierarchy", In Poc. of ACM WSD, 2008, 20 pages.
Chen, et al., "PVA: A Self-Adaptive Personal View Agent", Kluwer Academic Publishers, Journal of Intelligent Information Systems, Mar. 2002, pp. 173-194.
Cheng et al., "Auto-Generation of Topic Hierarchies for Web Images from Users' Perspectives", Proc 12th Intl Conf on Information and Knowledge Management, Nov. 2003, available at http://portal.acm.org/citation.cfM?id=956969, 4 pgs.
Cheng, et al., "Effective Image Annotation for Search Using Multi-level Semantics", ICADL 2003, Springer-Verlag Berlin Heidelberg, 2003, pp. 230-242.
Crandall, et al., "Mapping the World's Photos", WWW Conference Committee, Madrid, Spain, Apr. 20-24, 2009, 10 pgs.
Deng, et al., "ImageNet: A Large-Scale Hierarchical Image Database", retrieved on Apr. 16, 2010 at <<http://wordnet.cs.princeton.edu/papers/imagenet_cvpr09.pdf>>, Proceedings of the IEEE Conference on Computer Vision and Pattern Recognition (CVPR), 2009, pp. 1-8.
Deschacht, et al., "Text Analysis for Automatc Image Annotation", retrieved on Aug. 2, 2010 at <<http//class.inrialpes.fr/pub/106-deschacht-acl07.pdf>>, Meeting of the Association for Computational Linguistics, Prague, Jun. 2007, pp. 1-8.
Evans, et al., "Adaptive Multimedia Access: From User Needs to Semantic Personalisation", retrieved on Sep. 18, 2009 at http://nets.ii.uam.es/~acemedia/publications/iscas06.pdf, IEEE International Symposium on Circuits and Systems, ISCAS 2006, Kos, Greece, May 21-24, 2006, 4 pgs.
Fellbaum (ed.), "WordNet: An Electronic Lexical Database"retrieved on Apr. 16, 2010 at <<http://www.dsoergel.com/cv/C19.pdf>>, MIT Press, Cambridge, MA, May 1998, 7 pages.
Foo, et al., "Detection of Near-duplicate Images for Web Search", retrieved on Apr. 16, 2010 at <<http://www.cs.rmit.edu.au/~jufoo/pdfs/CIVR07_Foo.pdf>>, ACM, Proceedings of the 6th International Conference on Image and Video Retrieval (CIVR), Amsterdam, The Netherlands, Feb. 2007, pp. 557-564.
Gelasca, et al., "CORTINA: Searching a 10 Million + Images Database", retrieved on Apr. 16, 2010 at <<http://vision.ece.ucsb.edu/publications/elisa_VLDB_2007.pdf>>, VLDB Endowment, Proceedings of Conference on Very Large Data Bases (VLDB), Vienna, Austria, vol. 7, Sep. 2007, pp. 2-5.
Grcar, et al., "User Pofiling for Interest-Focused Browsing History", Oct. 2005, retrieved on Sep. 18, 2009 at http://eprints.pascal-network.org/archive/00001202/01/GrcarBrowsingHistorySiKDD2005.pdf, 4 pgs.
Griffin, et al., "Caltech—256 Object Category Dataset", retrieved on Apr. 16, 2010 at <<http://authors.library.caltech.edu/7694/1/CNS-TR-2007-001.pdf>>, Caltech Technical Report 7694, 2007, pp. 1-20.
Gunduz, et al., "A User Interest Model for Web Page Navigation", In Proceedings of International Workshop on Data Mining for Actionable Knowledge (DMAK), Seoul, Korea, Apr. 2003, pp. 46-57.
Hays, et al., "Scene Completion Using Millions of Photographs", retrieved on Apr. 16, 2010 at <<http://delivery.acm.org/10.1145/1280000/1276382/a4-hays.pdf?key1=1276382&key2=4013141721&coll=GUIDE&dl=GUIDE&CFID=84511483&CFTOKEN=74352152>>, ACM, Transactions on Graphics, vol. 26, No. 3, Article 4, Jul. 2007, pp. 1-8.
Hua, et al. "When Multimedia Advertising Meets the New Internet Era", Int'l Workshop on Multimedia Signal Processing, pp. 1-5, 2008.
Huang, et al., "Image Indexing Using Color Correlograms", Proc 1997 Conf on Computer Vision and Pattern Recognition (CVPR'97), Jun. 1997, 7 pages.
Jaspers et al., "CANDELA—Storage, Analysis and Retrieval of Video Content in Distributed Systems", retrived at <<http://vca.ele.tue.nl/publications/data/jaspers2005a.pdf>>, on Apr. 17, 2010.
Jeon, et al., "Automatic Image Annotation and Retrieval Using Cross-Media Relevance Models", Proc 26th Annual Intl ACM SIGIR Conf on Research and Development in Information Retrieval, Jul. and Aug. 2003, available at http://ciir.cs.umass.edu/pubfiles/mm-41.pdf, 8 pgs.
Jeon, et al., "Using Maximum Entropy for Automatic Image Annotation", 3rd Intl Conf Image and Video Retrieval, CIVR Jul. 2004, Proceedings Series: Lecture Notes in Computer Science, 3115, available at http://ciir.cs.umass.edu/pubfiles/mm-355.pdf, 9 pgs.
Jing, et al., "Learning Region Weighting from Relevance Feedback in Image Retrieval" in Proc. of IEEE Int. Cong. on Acoustics Speech and Signal, 2002, 4 pages.
Jones, "Windows Live Photo and Video Blog", retrieved on Aug. 3, 2010 at <<http://blogs.msdn.com/b/pix/archive/2008/09/17/next-version-of-windows-live.aspx>>, Sep. 17, 2008, pp. 1.
Joshi, et al. "Keyword Generation for Search Engine Advertising" In Proc. of the 6th IEEE Int. Cong. on Data Mining—Workshops, Dec. 2006, 24 pages.
Ke, et al., "PCA-SIFT: A More Distinctive Representation for Local Image Descriptors", retrieved on Apr. 16, 2010 at <<http://www.cs.cmu.edu/~rahuls/pub/cvpr2004-keypoint-rahuls.pdf>>, IEEE Computer Society, Conference on Computer Vision and Pattern Recognition (CVPR), vol. 2, Jun. 2004, pp. 1-8.
Keyword Tool, retrieved on Sep. 18, 2009 at https://adwords.google.com/select/KeywordToolExternal, 1 pg.
Kim, H.R. et al., "Learning Implicit User Interest Hierarchy for Context in Personalization.", In Proc. of International Conference on Intellegent User Interface, 2003, 8 pages.
Lacera A. et al., "Learning to Advertise", SIGIR, pp. 549-556, 2006.
Letizia, L.H. "An Agent that Assists Web Browsing." In Proc. of the International Joint Conference on Aritficial Intellegence, Montreal, CA, 1995, 6 pages.
Li, et al., "Delivering Online Adversitisements Inside Images," In Proc. of ACM Multimedia, Cancouver, Canada, Oct. 2008. 10 pages.
Li, et al., "Image Annotation by Large-Scale Content-based Image Retrieval", retrieved on Apr. 16, 2010 at <<http://doi.acm.org/10.1145/1180639.1180764>>, ACM, Proceedings of the 14th Annual International Conference on Multimedia, Santa Barbara, CA, Oct. 2006, pp. 607-610.
Li, et al., "Searching One Billion Web Images by Content: Challenges and Opportunities", retrieved on Apr. 16, 2010 at <<http://research.microsoft.com/en-us/um/people/leizhang/paper/mcam07-li.pdf>>, Springer-Verlag Berlin, Proceedings of International Workshop on Multimedia Content Analysis and Mining (MCAM), Weihai, China, Jul. 2007, pp. 33-36.

(56) References Cited

OTHER PUBLICATIONS

Li, et al. "Tag-Based Social Interest Discovery." WWW, pp. 675-684. 2008. 10 pages.
Liao et al, "LiveImage: Organzing Web Images by Relevent Concept", Poceedings of the Workshop on the Science of the Artificial, Hualien, Taiwan, Dec. 2005. pp. 210-220.
Lieberman, et al., "Aria: An Agent for Annotatng and Retreving Images", rereved on Sep. 21, 2009 at <<http://www.bubblemountain.com/images/Arai-IEEE.pdf>>, IEEE, 2001, pp. 1-6.
Lin et al., "Video Collaborative Annotation Forum: Establishing Ground-Truth Labels on Large Multimedia Datasets", IBM T.J. Watson research Center, 2003, pp. 1-pp. 19.
Liu, et al., "Robust Photo Retrieval Using World Semantics", retrieved on Sep. 21, 2009 at <<http://web.media.mit.edu/~lieber/Publications/LREC.pdf>>, 2002, 6 pages.
Lu, et al., "A Unified Framework for Semantics and Feature Based Relevance Feedback in Image Retrieval Systems", ACM Multimedia 2000, ACM, 2000, pp. 31-37.
Ma, et al., "Interest-Based Personalized Search", ACM Trans. on Information Systems, vol. 25(1), 2007, 38 pages.
Mei, et al., "Contextual In-Image Advertising", retrieved on Oct. 27, 2009 at <<http://www.cs.clemson.edu/~jzwang/0901863/mm2008/p439-mei.pdf>>, MM 2008, ACM, Oct. 2008, pp. 439-448.
Middleton, et al., "Capturng Knowledge of User Peferences: Ontologies in Recommender Systems." In Proc. of the 1st Internatonal Congerence on Knowledge Capture (K-Cap2001), Victoria, BC, Canada, 2001,8 pages.
Monaghan, et al., "Automating Photo Annotation using Services and Ontologies", retrieved on Aug. 2, 2010 at <<http://ieeexplore.ieee.org/stamp/stamp.jsp?arnumber=01630615>>, IEEE Computer Society, Proceedings of International Conference on Mobile Data Management (MDM), 2006, pp. 1-4.
Monga, et al., "Clustering Algorithms for Perceptual Image Hashing", 2004 IEEE 11th Digital Signal Processing Workshop and IEEE Signal Processing Education Workshop, IEEE, 2004, pp. 283-287.
Moxley, et al., "Automatic Video Annotation through Search and Mining", retrieved on Apr. 16, 2010 at <<http://ieeexplore.ieee.org/stamp/stamp.jsp?tp=&arnumber=4607527>>, IEEE Conference on Multimedia and Expo (ICME), Hannover, Germany, Jun. 2008, pp. 685-688.
Murdock, et al., "A Noisy-Channel Approach to Contextual Advertising." ADKDD, pp. 21-28, 2007.
"ODP—The Open Directory Project", retrieved on Apr. 16, 2010 at <<http://dmoz.org/>>, 2010, pp. 1.
Ono, et al., "A Flexible Content-Based Image Retrieval System with Combined Scene Description Keyword", IEEE Proceedings of Multimedia 1996, IEEE, 1996, pp. 201-208.
Osman, et al., "Semantic Annotation and Retrieval of Image Collections", retrieved on Aug. 2, 2010 at <<http://www.scs-europe.net/conf/ecms2007/ecms2007-cd/ecms2007/ecms2007%20pdf/vv_0167.pdf>>, Proceedings European Conference on Modelling and Simulation (ECMS), 2007, pp. 1-6.
Pan, et al., "Automatic Image Captioning" , IEEE Intl Conf on Multimedia and Expo, Jun. 2004, available at http://www.informedia.cs.cmu.edu.documents/ICMEO4AutoICap.pdf, 4 pgs.
Plangprasopchok, et al. "Constructing Folksonomies from User-Specified Relations on Flickr." WWW, 2009, 10 pages.
Qiu, et al., "Compressing histogram representations for automatic colour photo categorization", The Journal of the Pattern Recognition Society, Elsevier, vol. 37, Issue 11, 2004, pp. 2177-2193.
Ribeiro-Neto, et al., "Impedance Coupling in Con-tent-targeted Advertising." SIGIR, pp. 496-503, 2005, 8 pages.
Satoh, et al., "Name-It: Naming and Detecting Faces in News Videos", retrieved on Aug. 2, 2010 at <<http://www.informedia.cs.cmu.edu/documents/nameit_IEEE-MM99.pdf>>, IEEE Computer Society, Multimedia, vol. 6, No. 1, 1999, pp. 22-35.
Torralba, et al., "80 million tiny images: a large dataset for non-parametric object and scene recognition", retrieved on Apr. 16, 2010 at <<http://people.csail.mit.edu/torralba/publications/80millionImages.pdf>>, IEEE Computer Society, Transactions on Pattern Analysis and Machine Intelligence, vol. 30, No. 11, Nov. 2008, pp. 1958-1970.
Trajkova, et al., "Improving Ontology-Based User Profiles." In Proc. of RIAO, pp. 380-389, 2004.
Tseng et al., "Video Summarization and Personalization for Pervasive Mobile Devices", IBM T.J. Watson Research Center, 2002, pp. 1-pp. 12.
VTT,"MobiCon—Integrated Capture, Annotation and Sharing of Video Clips with Mobile Phones", retrvied at <<http://www.vtt.fi/files/services/ipr/mobicon_integrated_capture.pdf>> on Apr. 17, 2010.
Wang, et al., "Advertising Based on Users' Photos", retrieved on Apr. 16, 2010 at <<http://ieeexplore.ieee.org/stamp/stamp.jsp?tp=&arnumber=5202834>>, IEEE International Conference on Multimedia and Expo (ICME), New York, NY, 2009, pp. 1640-1643.
Wang, et al., "AnnoSearch: Image Auto-Annotation by Search", Proc 2006 IEEE Computer Society Conf on Computer Vision and Pattern Recognition, Mar. 2006, , 8 pgs.
Wang, et al., "AnnoSearch: Image Auto-Annotation by Search", retrieved on Apr. 16, 2010 at <<http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.
Wang, et al. "Annotating Images by Mining Image Search Results", I-PAMI, vol. 30(11), pp. 1919-1932, 2008.
Wang, et al., "Argo: Intelligent Advertising by Mining a User's Interest from His Photo Collections", retrieved on Oct. 27, 2009 at <<http://research.microsoft.com/en-us/people/xjwang/argo_wangyuzhang_.pdf>>, ADKDD 2009, ACM, Jun. 2009, 9 pages.
Wang, et al., "ARISTA—Image Search to Annotation on Billions of Web Photos", retrieved on Aug. 2, 2010 at <<http://research.microsoft.com/en-us/people/xjwang/cvpr10_paper301_arista_final.pdf>>, IEEE Computer Society, Proceedings of Conference on Computer Vision and Pattern Recognition (CVPR), San Francisco, California, Jun. 2010, pp. 1-8.
Wang, et al., "Content-Based Image Annotation Refinement", retrieved on Apr. 16, 2010 at <<http://research.microsoft.com/en-us/um/people/leizhang/paper/cvpr07-changhu.pdf>>, IEEE Conference on Computer Vision and Pattern Recognition (CVPR), Jun. 2007, pp. 1-8.
Wang, et al., "Image Annotation Using Search and Mining Technologies", Proc 15th Intl Conf on World Wide Web, May 2006, 2 pages.
Wang, et al., "Large-Scale Duplicate Detection for Web Image Searh", 2006 IEEE Intl Conf on Multimedia and Expo, Jul. 2006, 4 pages.
Wang, et al., "Large-Scale Duplicate Detection for Web Image Search", retrieved on Apr. 16, 2010 at <<http://www.cecs.uci.edu/~papers/icme06/pdfs/0000353pdf>>, IEEE Conference on Multimedia and Expo (ICME), Toronto, Canada, Jul. 2006, pp. 353-356.
"Web Search & Mining Group" retrieved Feb 27, 2006 at http://www.research.microsoft.com/wsm, 5 pgs.
Wenyin, et al., "Semi-Automatic Image Annotaton", Proc of Interact 2001 8th IFIP TC.13 Conf on Human Computer Interaction, Jul. 2001, 8 pgs.
Wordtracker, http://www.wordtracker.com, Feb. 22, 2010.
Yamamoto et al., "iVAS: Web-based Video Annotation System and its Applications", retrived at <<http://iswc2004.semanticweb.org/demos/29/paper.pdf>> on Apr. 17, 2010, pp. 1-pp. 4.
Yeh, et al., "Searching the Web with Mobile Images for Location Recognition", IEEE, 2004, pp. 6.
Zeng, et al., "Learning to Cluster Web Search Results", Proc 27th Annual Intl ACM SIGIR Conf on Reseach and Development in Information Retrieval, Jul. 2004, pp. 210-217.
Zhang, et al., "EnjoyPhoto—A Vertical Image Search Engine for Enjoying High-Quality Photos", retrieved on Apr. 16, 2010 at <<http://research.microsoft.com/en-us/um/people/leizhang/paper/acmmm06-enjoyphoto.pdf>>, ACM, Proceedings of the 14th Annual International Conference on Multimedia (MM), Santa Barbara, California, Oct. 2006, pp. 367-376.
Zhou, et al. "Utilizing Search Intent in Topic Ontology-based User Profile for Web Mining." In Proc. Of IEEE Int. Conf. on Web Intellegence, 2006, 4 pages.

(56) References Cited

OTHER PUBLICATIONS

Translated the Chinese Office Action mailed Jul. 6, 2011 for Chinese patent application No. 200780017842.6, a counterpart foreign application of U.S. Appl. No. 11/419,368.
Office Action for U.S. Appl. No. 11/419,368, mailed on Aug. 5, 2011, Lei Zhang, "Annotation by Search".
"Auto-Generation of Topic Hierarchies for Web Images from Users' Perspectives" Available at http://portal.acm.org/citation.cfm?id=956969.
The Chinese Office Action mailed Feb. 5, 2013 for Chinese patent application No. 200780017842.6, a counterpart foreign application of U.S. Appl. No. 11/419,368, 7 pages.
Office action for U.S. Appl. No. 12/790,761, mailed on Feb. 24, 2013, El-Saban et al., "Real-Time Annotation and Enrichment of Captured Video", 12 pages.
Office Action for U.S. Appl. No. 12/563,955, mailed on May 6, 2013, Wang et al., "Interest Learning from an Image Collection for Advertising ", 25 pages.
Office action for U.S. Appl. No. 12/790,772, mailed on Jun. 3, 2013, Wang et al., "Associating Media With Metadata of Near-Duplicates", 15 pages.
"Welcome to Flickr—Photo Sharing", retrieved on Feb. 4, 2010, at <<http://www.flickr.com/>>, Yahoo!, 2010, 1 page.
"Google", retrieved on Feb. 16, 2011, at <<http://www.google.com/webhp?rls=ig>>, Google, 2011, 1 page.
Translated copy of the Korean Office Action mailed Jun. 14, 2013 for Korean patent application No. 10.2008-7028292, a counterpart foreign application of US patent No. 8,341,112, 7 pages.
"NeedleSeek", retrieved on Feb. 16, 2011, at << http://needleseek.msra.cn>>, Microsoft, 2008, 1 page.
Office action for U.S. Appl. No. 13/110,282, mailed on Jul. 30, 2013, Xin-Jing Wang et al, "Text to Image Translation", 18 pages.
Office action for U.S. Appl. No. 12/790,761, mailed on Jun. 10, 2013, El-Saban et al., "Real-Time Annotation and Enrichment of Captured Video", 12 pages.

* cited by examiner

BUILDING A PERSON PROFILE DATABASE

CROSS REFERENCE TO RELATED APPLICATIONS

This application is related to U.S. Patent Application Publication No. 2007/0271226 entitled "Annotation by Search" filed on May 19, 2006 and U.S. patent application Ser. No. 12/790,772 entitled "Associating Media with Metadata of Near-Duplicates" filed on May 28, 2010, the entirety of both which are incorporated herein by reference.

BACKGROUND

Recent years have witnessed an explosive growth of multimedia data and large-scale image/video datasets readily available on the Internet. Among various web images on virtually any topic, images of persons (i.e., celebrities, historical figures, athletes, etc.) including portraits, posters, movie snapshots and news images are of particular interests to end-users. The fact that person-related queries constantly rank the highest among all the image queries clearly reveals the intensive user interests for images of persons. However, organizing images of persons on the Internet still remains a challenge to researchers in the multimedia community.

Among the challenges to organizing images of persons is identifying a name (or other information, e.g., birth date, occupation, etc.) of a person in an image. Currently, there exists no large-scale, searchable, person profile database. Manual annotation and organization of images represents a very labor intensive and time consuming task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the application describes automatically identifying a name of a person in an image. The identifying includes detecting visual features from a received image and collecting visually similar images to the received image along with text that is proximate or surrounding the visually similar images. A name, and/or other additional information, is determined from the text and output to a user. In one embodiment, an output of the applied techniques is a database of images of people, such as celebrities, including pertinent information associated with the people in the images such as: a name of each person, a birth date, a gender, an occupation of each person, and the like.

In alternate embodiments, techniques may be employed to identify an object or other entity in an image (e.g., a building, a landmark, a product, etc.), and provide a name for the object or entity, as well as other information about the object or entity when it is available.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Various techniques for identifying a name of a person or an entity in an image are disclosed. For ease of discussion, the disclosure describes the various techniques with respect to a person in the image. However, the descriptions also may be applicable to identifying a name of an entity such as an object, a landmark, and the like.

In one embodiment, techniques are employed to automatically identify the name of persons (i.e., celebrities, historical figures, athletes, etc.) in images and output a large-scale, searchable, person profile database comprising the images with the associated names. An example person profile database may include one or more images of each person, and may also include information (or annotations) regarding each person (e.g., name, gender, occupation, birth date, etc.). Further, the person database may be browse-able or searchable based on classifications integrated into the database, or the like. For example, a user may search such a person database for "middle-aged female recording artists," based on age, gender, and occupation classifications. Additionally, such a person database may be used in conjunction with a person recognition engine to recognize celebrities in an unconstrained dataset, or be used for training image-understanding algorithms. In alternate embodiments, techniques may be employed to present other outputs (e.g., one or more annotated images, particular information associated with a person or object of interest, etc.) to a user.

Various techniques for identifying a name of a person or an entity in an image are disclosed as follows. An overview of a system or method of identifying a name of a person or an entity in an image is given with reference to FIGS. 1-3. Example methods for identifying a name of a person or an entity in an image are discussed with reference to FIG. 4.

Overview

Figure 1:
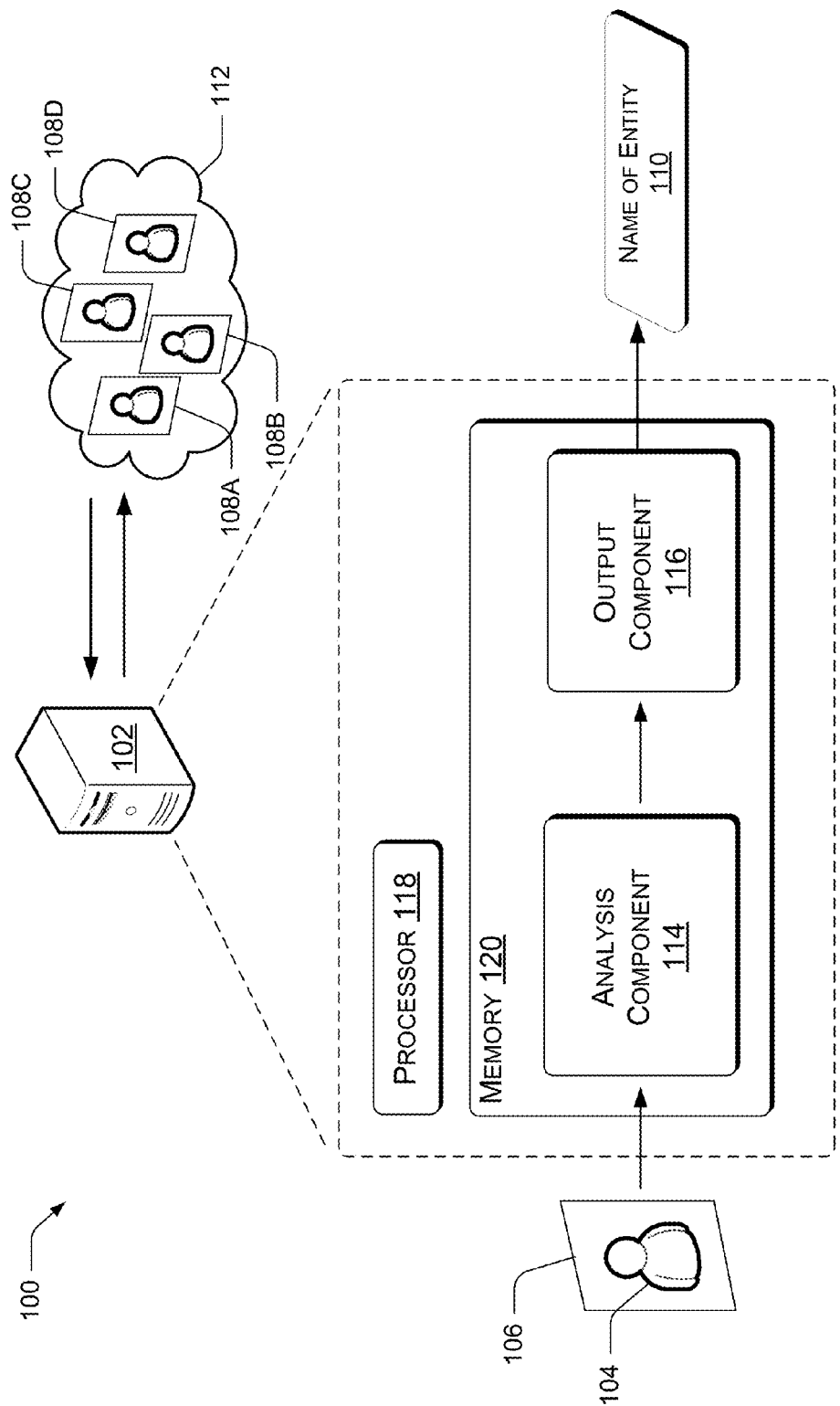
FIG. 1 illustrates a block diagram of a system that identifies a name of an entity in an image, including example system components, according to an example embodiment.

In general, the results of multiple image searches may be leveraged to identify the name of a person or object in an image. FIG. 1 is a block diagram of an arrangement 100 that is configured to identify a name of an entity in an image, according to an example embodiment. In one embodiment, a system 102 exploits the results of multiple image searches (e.g., via the Internet), to identify the name of an entity 104 in a query image 106. In the illustration, example inputs to the system 102 include a query image 106 (submitted by a user, for example) and one or more visually similar images 108 (obtained from a corpus of images, e.g., via the Internet, for example). Example outputs of the system 102 include a name of an entity 110. In alternate embodiments, fewer or additional inputs may be included (e.g., feedback, constraints, etc.). Additionally or alternately, other outputs may also be included, such as a person profile database, as will be discussed further.

In the example embodiment of FIG. 1, the system 102 receives the image 106. In one embodiment, the image 106 is a face image, and the entity 104 is a person. In an implementation, the image 106 is included as part of a search query (e.g., an automated query, a user query, etc.). In other implementations, the image 106 is a query. For example, a user may submit the image 106 to the system 102 to determine the identity of the entity 104 displayed within the image 106.

In one embodiment, the system 102 may be connected to a network 112, and may search the network 112 for visually similar images 108 to the image 106. In an embodiment, the system 102 collects one or more visually similar images 108 found on the network 112. In alternate embodiments, the network 112 may include a network (e.g., wired or wireless network) such as a system area network or other type of network, and can include several nodes or hosts, (not shown), which can be personal computers, servers or other types of computers. In addition, the network can be, for example, an Ethernet LAN, a token ring LAN, or other LAN, a Wide Area Network (WAN), or the like. Moreover, such network can also include hardwired and/or optical and/or wireless connection paths. In an example embodiment, the network 112 includes an intranet or the Internet.

The visually similar images (shown in FIG. 1 as 108A through 108D) represent various images that have similar visual characteristics to the query image 106 and/or the entity 104 displayed within the query image 106. For example, a visually similar image 108 may include the same person or object as the image 106. In alternate embodiments, one or more of the visually similar images 108 may be duplicates of image 106. While FIG. 1 shows four visually similar images 108A-108D, in alternate embodiments, the system 102 may find and/or collect fewer or greater numbers of visually similar images 108, including hundreds or thousands of visually similar images 108. The number of visually similar images 108 found and/or collected may be based on the number of images relating to a topic or person that have been posted to the Internet, for example.

The system 102 determines a name 110 of the entity 104 displayed in the image 106 based on the visually similar images 108. In alternate embodiments, the system 102 may employ various techniques to determine the name 110 based on the visually similar images 108, including analysis of text proximate to the visually similar images 108, as will be discussed further. In one embodiment, the system 102 outputs the name 110. For example, the system 102 may output the name 110 to a user, a process, a system, or the like. Additionally or alternately, the system 102 may output a person profile database (as discussed with reference to FIG. 3) or an entry from a person profile database that includes the name 110 of the entity 104 in the image 106.

Example Entity Identification Systems

Example entity identification systems are discussed with reference to FIGS. 1-3. FIG. 1 illustrates a block diagram of the system 102, including example system components, according to one embodiment. In one embodiment, as illustrated in FIG. 1, the system 102 is comprised of an analysis component 114 and an output component 116. In alternate embodiments, the system 102 may be comprised of fewer or additional components and perform the discussed techniques within the scope of the disclosure.

All or portions of the subject matter of this disclosure, including the analysis component 114 and/or the output component 116 (as well as other components, if present) can be implemented as a system, method, apparatus, or article of manufacture using standard programming and/or engineering techniques to produce software, firmware, hardware or any combination thereof to control a computer or processor to implement the disclosure. For example, an example system 102 may be implemented using any form of computer-readable media (shown as Memory 120 in FIG. 2) that is accessible by the processor 118. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory 120 is an example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may accessed by the processor 118.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

In one example embodiment, as illustrated in FIG. 1, the system 102 receives an image 106 as part of a query and detects one or more visual features from the image 106. If included, the analysis component 114 (as shown in FIG. 1) may provide detection of visual features to the system 102. For example, the analysis component 114 may use facial recognition techniques, or the like, when the image 106 is of a person, to detect the visual features. In one embodiment, the analysis component 114 includes a robust face detector to detect the visual features of the image 106. In alternate embodiments, the system 102 may use other techniques to detect visual features from the image 106 (e.g., graphical comparisons, color or shape analysis, line/vector analysis, etc.).

As illustrated in FIG. 1, the system 102 may be connected to a network 112, and may search the network 112, and collect visually similar images 108 (shown as 108A-108D) to the image 106, based on the detected visual features. Visual similarity may be detected or determined, for example, using a comparison of feature vectors, color or shape analysis, or the like. In one example, one or more visually similar images 108 are collected that have similar visual features to those detected in the image 106. In alternate embodiments, the visually similar images 108 may be collected from other sources such as optical or magnetic data storage devices (compact disk, digital versatile disk, tape drive, solid state memory device, etc.), and the like. The visually similar images 108 may be collected into the memory 120, or similar electronic storage that is local or remote to the system 102 and accessible to the processor 118.

Figure 2:
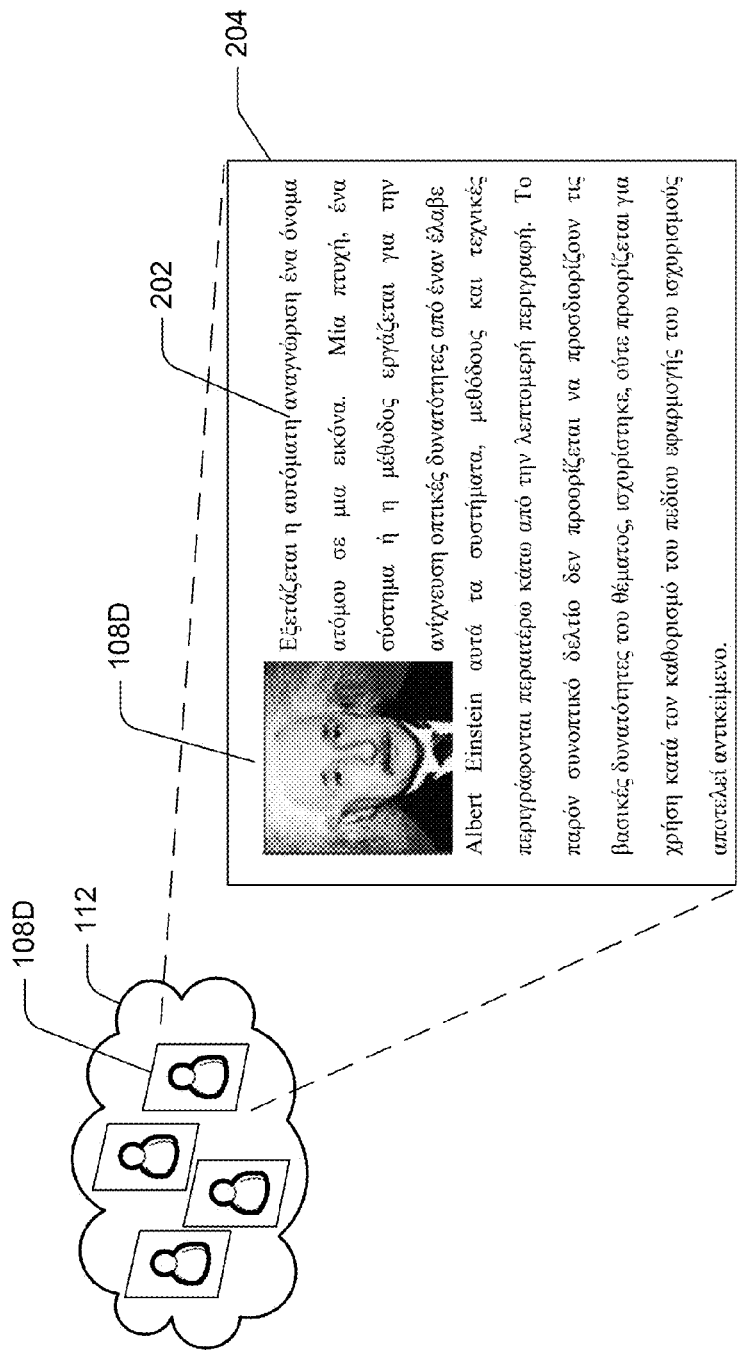
FIG. 2 illustrates a block diagram of an example visually similar image to a received image. The visually similar image is shown displayed along with text that is proximate or surrounding the visually similar image, according to an example embodiment.
Figure 3:
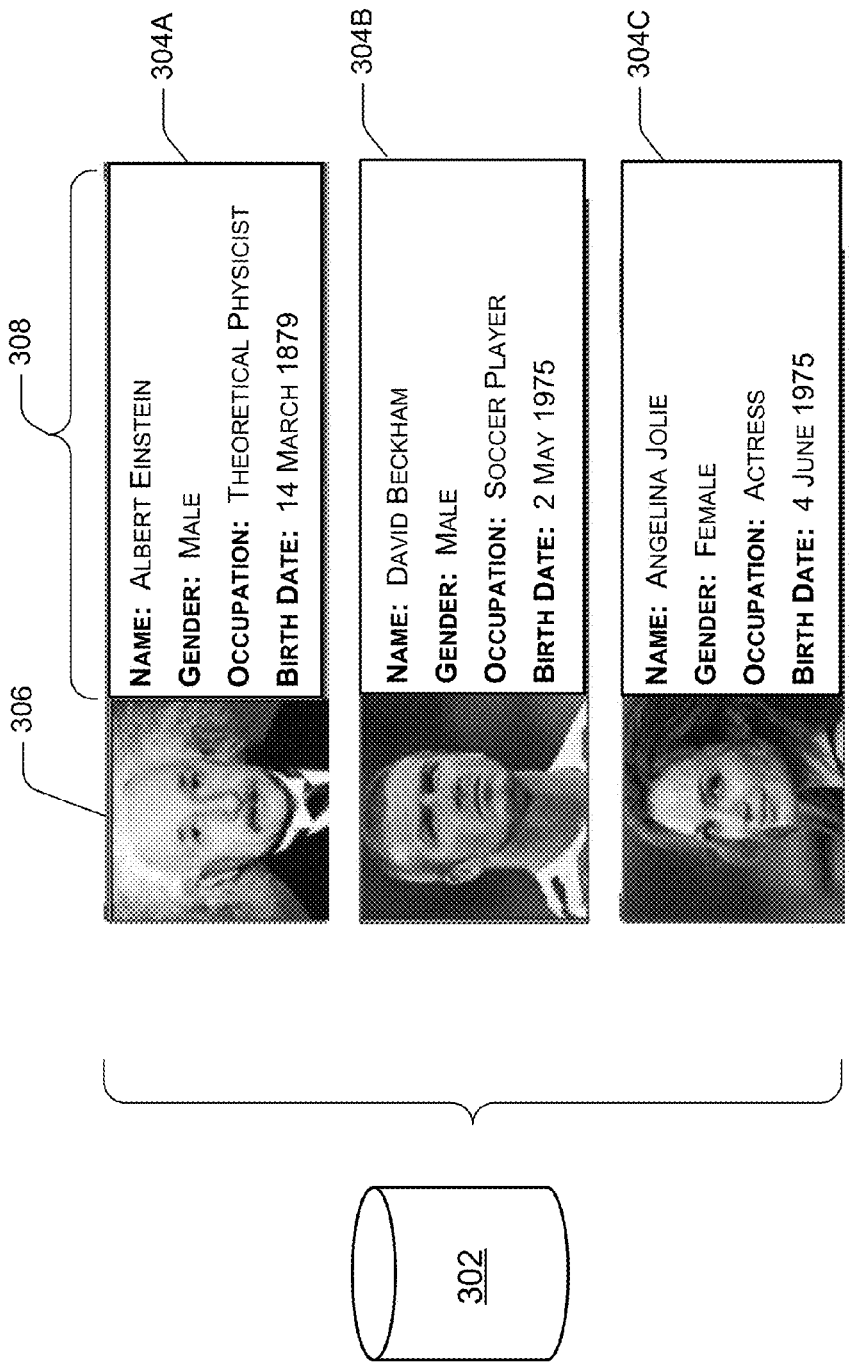
FIG. 3 illustrates a block diagram of one example output of the system of FIG. 1, including a database of images of people with example information, according to an embodiment.

Referring to FIG. 2, in one embodiment, the system 102 accumulates text 202 from a proximity of one or more of the visually similar images 108 (the example shown is 108D). For example, the system 102 may detect text 202 in the proximity of a visually similar image 108D while performing a search for visually similar images 108. The system 102 may be programmed, for example, to accumulate text 202 that appears on the same page as the visually similar image 108, text 202 within a predefined distance of the visually similar image 108, text 202 that includes predefined tags, and the like. The text 202 may be a header or the body of an article 204 where the visually similar image 108D appears. The text 202 may be a caption to the visually similar image 108D, a sidebar, information box, category tag, or the like. The system 102 may accumulate the text 202 it encounters to determine the name of the entity 104 displayed in the query image 106. For example, the analysis component 114 may compute a correlation between a name detected in the accumulated text and the image 106, as will be discussed further. The system 102 may accumulate text 202 from a proximity of multiple visually similar images 108, increasing the amount of text available for analysis.

Referring back to FIG. 1, in alternate embodiments, the system 102 may perform multiple searches for visually similar images 108 based on a single query image 106. The system 102 may aggregate accumulated text 202 from one or more of the multiple searches when the searches result in duplicate visually similar images 108. For example, if the system 102 encounters duplicate visually similar images 108, the system 102 may aggregate text 202 that is proximate to the visually similar images 108 to improve the identification of the entity 104 in the image 106.

In an embodiment, the analysis component 114 may filter the accumulated text 202 to obtain candidate names of the entity 104 in the image 106, as well as structured data associated with the image. Structured data, for example, may include information relating to a birth date, an occupation, a gender of the entity 104, and the like. In alternate embodiments, one or more filters may be employed to filter the accumulated text 202. For example, one technique includes using a large-scale dictionary of names as a filter. In one embodiment, a large-scale dictionary of names may be produced from an on-line information source or knowledge base (e.g., Wikipedia, celebrity or sport magazine web sites, etc.) and used to filter the accumulated text 202 to extract names (i.e., person names). In other embodiments, other information sources such as name classifiers, for example, may be used to produce name lists or similar filters.

In alternate embodiments, names may be recognized in the accumulated text 202 by various techniques. In one embodiment, a name may be recognized in the accumulated text 202 if the first name and the last name of an entity occur as a phrase in the accumulated text 202. For example, the phrase "Harry Potter," may occur in the accumulated text 202. In another embodiment, a name may be recognized in the accumulated text 202 if a partial match of an entity name occurs in the accumulated text 202. For example, either the first or the last name of the entity may be present (e.g., "Harry" or "Potter"). Additionally or alternately, a name may be recognized in the accumulated text 202 if a combined name occurs in the accumulated text 202. For example, a concatenated term such as "harrypotter," or the like, may be present in the accumulated text 202. In alternate embodiments, other techniques may be employed to recognize entity names in the accumulated text 202. For example, entity name recognition algorithms may be used that recognize capitalization, look for key words and phrases, look at the content or context of the surrounding text, and the like.

In various embodiments, algorithms may be used to determine the correct name 110 for the entity 104. In alternate embodiments, more than one name may be correct for an image 106. For example, an image 106 may include more than one entity (or person). Accordingly, there may be more than one "correct" name 110 for an image 106.

In one embodiment, the following algorithm may be used to determine a correct name 110 for an image 106. In the algorithm, $I_q$ may be denoted as the image 106, $I_i$ may be denoted as the i-th visually similar image of $I_q$, t may be denoted as a candidate name of the entity 104, $S_i$ may be denoted as the accumulated (surrounding) texts 202 for $I_i$. The example data-driven algorithm may perform a name determination by optimizing the following formula:

$$t^* = \operatorname*{argmax}_t \sum_i p(t \mid I_i) p(I_i \mid I_q)$$

where $p(I_i/I_q)$ measures a visual similarity between $I_i$ and $I_q$ and $p(t|I_i)$ measures a correlation between t and $I_i$. In one embodiment, this example formula may be applied using a majority voting technique. For example, $p(t|I_i)$ may be set to:

$$p(t \mid I_i) = \begin{cases} 1 & \text{if } t \in S_i \\ 0 & \text{otherwise} \end{cases}$$

Each name candidate t may be scored by its document frequency (DF) in the duplicate search results and names with the highest DF may be determined to be a correct name 110 for the entity 104 in the image 106. Additionally or alternately, the analysis component 114 may use various machine learning techniques to determine a confidence of a candidate name t belonging to an entity 104 in the image 106.

In alternate embodiments, additional techniques may be applied. For example, name determination may be treated as a binary classification problem. Candidate names t may be obtained from surrounding text 202 ($S_i$) using, for example, a large-scale name dictionary (created, for example, from Wikipedia). The candidate names t may be obtained, for example, by filtering the surrounding text 202 ($S_i$) using the name dictionary. In alternate embodiments, a name dictionary may be customized to contain one or more classes or types of names (e.g., celebrities, sports personalities, politicians, etc.) to improve results.

In an embodiment, the analysis component 114 may train a binary classification model with a support vector machine (SVM). The correct candidate name 110 may be determined based on a binary classifier. For example, a web page that is collected based on having a visually similar image 108 may be converted to a feature vector. This may include extracting "bag-of-word" features from portions of the page (e.g., information box, category tags, etc.). The SVM may be used to learn a predicting model based on the contents of one or more feature vectors. Additionally, alternate embodiments may implement an artificial intelligence component in conjunction with the analysis component 114, or another classifier, including classifiers that are explicitly or implicitly trained.

In one embodiment, the training data for the SVM are: feature vectors $\{\vec{X_q}\}$ (q=1 ... N) for candidate names $\{t_q\}$, and labels $\{Y_q\}$ indicating whether $\{t_q\}$ is a true person name of $\{I_q\}$. In one majority voting embodiment, $\vec{X_q}$ is a score which equals the frequency of $t_q$ occurring in the duplicate search results of $I_q$. In an alternate embodiment, $\vec{X_q}$ may be expanded to a vector, with each dimension representing a different type of feature.

In some embodiments, when making a determination of whether a name extracted from accumulated text 202 is a correct name for an image 106, weight may be given to some accumulated text 202 over other accumulated text 202. For example, text that is accumulated from universal resource locator (URL) text or captions of images 108 may be given more weight than page title text. In other embodiments, different weights may be given to other accumulated text 202.

In some embodiments, weight may be given based on the frequency with which a candidate name t appears in accumulated text 202. For example, frequency may correspond to the times that $t_q$ occurs in duplicate search results of $I_q$. A ratio $r_q$ may be set to measure the percentage of duplicate search results in which $t_q$ occurs. If frequency is set to $f_q$, and the number of near-duplicate images for $I_q$ is $M_q$, then $r_q$ may be computed as $$\frac{f_q}{M_q}.$$

For example, $t_q$ may be considered a true person name 110 of $I_q$ when both $f_q$ and $r_q$ are high.

In some embodiments, using a general SVM model (e.g., includes non-linear or linear models), the analysis component 114 may compute a final score for $t_q$, determining the name 110 of the entity 104, based on an algorithm comprising the equation:

$$v(t_q)=f(\vec{W},\vec{X_q})$$

where v is a kind of score (e.g. a probability) that a candidate name $t_q$ is the name of the entity in the included image and $f(\cdot)$ represents a function (linear or non-linear) on model parameter $\vec{W}$, which is learned from the training data provided and feature vector $\vec{X_q}$, which represents the candidate name $t_q$, (e.g., the frequency that $t_q$ occurs in the proximity texts of near-duplicate or visually similar images, whether $t_q$ appears in the name dictionary, whether $t_q$ is capitalized, etc.).

In one embodiment, with a linear model trained by SVM, the analysis component 114 may compute a final score for $t_q$, determining the name 110 of the entity 104, based on an algorithm comprising the equation:

$$v(t_q)=\vec{W}^T*\vec{X_q}+b$$

where v is a probability that a candidate name $t_q$ is the name of the entity in the included image, $\vec{W}^T$ and b are model parameters that are learned from provided training data, while $\vec{X_q}$ represents the feature vector of the candidate name $t_q$, (e.g., the frequency that $t_q$ occurs in the proximity texts of near-duplicate or visually similar images, whether $t_q$ appears in the name dictionary, whether $t_q$ is capitalized, etc.).

In an embodiment, scores for person names (and/or other information) may be stored for use by the system 102. In alternate embodiments, the scores (or other information) may be stored local to the system 102, for example within memory 120, or remote from the system 102. The system 102 may access the information during a search of the results (a person database, for example) to improve search results.

In one embodiment, W and b may be learned by the SVM. Using this algorithm, if $v(t_q)$ exceeds a certain threshold, then $t_q$ may be determined to be the correct name 110 for the entity 104 in the image 106. In alternate embodiments, different weights may be assigned to different types of features to improve accuracy of the algorithm.

If included, the output component 116 (as shown in FIG. 1) may provide an output from the system 102. For example, an output may be provided from the system 102 to another system or process, and the like. In an embodiment, the output may include a name 110 of the entity 104 in the image 106. In an alternate embodiment, the output may also include information (or annotations) regarding each entity 104 in the image 106 (e.g., name, gender, occupation, birth date, etc.).

In various embodiments, the name 110 of the entity 104 may be presented in the form of a prioritized list, a general or detailed analysis, and the like. In one embodiment, the name 110 may be presented in the form of a large-scale person profile database 302, as discussed above, and shown in FIG. 3. The person profile database 302 of FIG. 3 is illustrated as showing three example person records 304A, 304B, and 304C. In one embodiment, as illustrated in FIG. 3, a person record 304 may include an image 306 of a person and associated information 308. The associated information 308 may include, for example, a name of the person, a gender, an occupation, a birth date, and the like. As described above, various techniques may be applied to obtain the associated information 308 and to associate the information to the image of the person 306. In alternate embodiments, other configurations may be used to display the images 306, the associated information 308, as well as other details as desired (e.g., links to web pages, multimedia presentations, user comments, etc.).

In alternate embodiments, the name 110 of the entity 104 within the image 106 and any obtained associated information 308 may be classified using any number of classifiers. For example, with the application of classifiers for gender, occupation, and age, the person database 302 may be searched for images of "a female singer between the ages of 40 and 70 years old." Alternately or additionally, other classifiers (e.g., entertainers, sports figures, young persons, middle-aged persons, etc.) may be used to categorize or filter the records 304 of the database 302. Including classifiers within the database 302 may allow for scalable searching, as well as more refined research results.

In one embodiment, the output of the system 102 is displayed on a display device (not shown). In alternate embodiments, the display device may be any device for displaying information to a user (e.g., computer monitor, mobile communications device, personal digital assistant (PDA), electronic pad or tablet computing device, projection device, imaging device, and the like). For example, the name 110 may be displayed on a user's mobile telephone display. In alternate embodiments, the output may be provided to the user by another method (e.g., email, posting to a website, posting on a social network page, text message, etc.).

Based on a person recognition prototype, a very useful scenario can be implemented, for example, using mobile devices. For example, a user may be interested in getting information about a person in a magazine, on TV, or in a movie. The user can take a picture of the person using, for example, a camera on the user's smart phone, and upload the image to search the person profile database 302. In alternate embodiments, the user may receive a name of the person, detailed information about the person, additional images of the person, related personalities to the person, links to additional information, and the like.

Illustrative Processes

Figure 4:
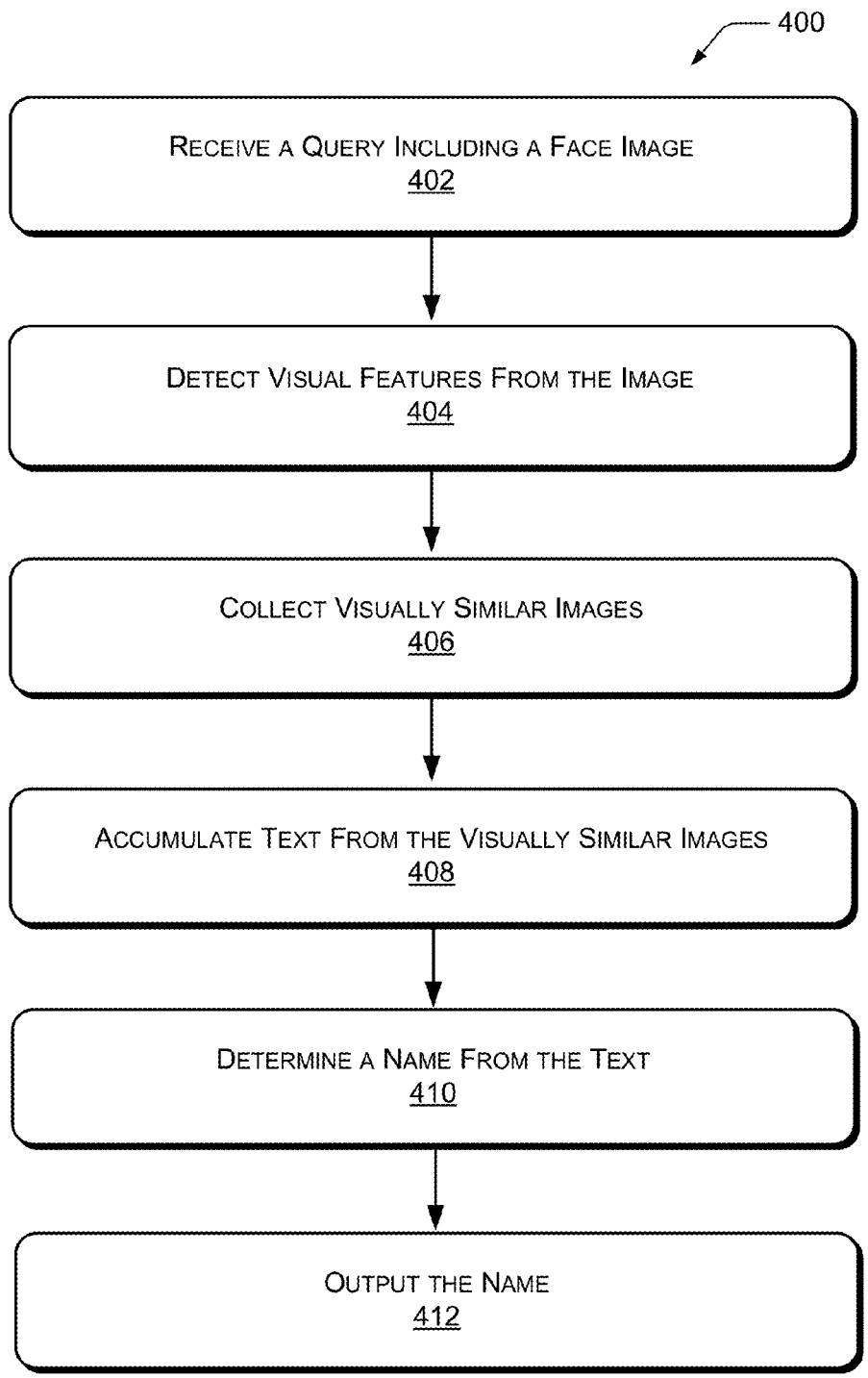
FIG. 4 illustrates an example methodology of identifying a name of an entity in an image, according to an example embodiment.

FIG. 4 illustrates an example methodology for automatically identifying a name of an entity in an image, according to an example embodiment. While the exemplary methods are illustrated and described herein as a series of blocks representative of various events and/or acts, the subject matter disclosed is not limited by the illustrated ordering of such blocks. For instance, some acts or events may occur in different orders and/or concurrently with other acts or events, apart from the ordering illustrated herein. In addition, not all illustrated blocks, events or acts, may be required to implement a methodology in accordance with an embodiment. Moreover, it will be appreciated that the exemplary methods and other methods according to the disclosure may be implemented in association with the methods illustrated and described herein, as well as in association with other systems and apparatus not illustrated or described.

FIG. 4 illustrates an example methodology 400 of automatically identifying a name of an entity in an image, according to an example implementation. In the illustrated example implementation, the entity is a person, and the image is a face image. However, the illustrated method is also applicable to automatically identifying other entities (e.g., an object, a landmark, etc.) in images.

At block 402, a system or device (such as the system 102, for example) receives a query including an image (such as the image 106, for example). In one embodiment, as illustrated, the image is a face image. In alternate embodiments, the image may be that of an object, product, building, landmark, monument, or the like.

At block 404, the method includes (for example, a system or a device may perform acts including) detecting visual features from the image. Face recognition techniques, for example, may be employed to detect visual features from the image when the image is a face image. In alternate embodiments, other techniques may be employed to detect visual features from the image (e.g., graphical comparisons, color or shape analysis, line vector analysis, etc.).

At block 406, the method includes collecting one or more visually similar images to the query image. In one embodiment, the method includes using the visual features detected from the query image to collect the visually similar images. For example, visually similar images may be collected if they have one or more of the visual features of the query image. The visually similar images may be collected from a network, for example, such as the Internet. In alternate embodiments, the visually similar images may be collected from one or more data stores, such as optical or magnetic data storage devices, and the like.

In some embodiments, one or more of the visually similar images collected may be duplicates or near-duplicates of each other, or duplicates or near-duplicates of the query image. In other embodiments, the visually similar images may not be duplicates, but may be similar, for example, containing the same person(s) or object(s) as each other, or containing the same person(s) or object(s) as the query image.

At block 408, the method includes accumulating text from a proximity of the visually similar images. For example, one or more of the visually similar images collected may have been collected from a source having text (as illustrated in FIG. 2, for example) surrounding (or in the general vicinity) of the visually similar image. The text may be a caption or a header for an article associated with the visually similar image, or the text may be a body of an article, for example. In one embodiment, the method may include leveraging multiple searches by aggregating accumulated text from the multiple searches. Further, the method may include giving additional weight to text accumulated from a proximity of duplicate or near-duplicate images, or visually close similar images to the query image.

In various embodiments, techniques are used to suppress noise text (such as incorrect names) from the accumulated text to improve performance. One example includes grouping the visually similar images based on a similarity of web page addresses from where the visually similar images are collected. For example, visually similar images may be grouped based on the web sites they are collected from.

In one embodiment, visually similar images may be grouped based on an algorithm configured to compute the similarity of the hosting web pages. For example, the similarity between two URLs may be computed by segmenting the $i^{th}$ URL to a set of terms $U_i = \{u_i^k\}$, and computing the similarity between the $i^{th}$ and $j^{th}$ URLs with the equation:

$$Sim_{URL} = \frac{|U_i \cap U_j|}{\max(|U_i|, |U_j|)}$$

At block 410, the method includes determining a name of the entity in the query image from the accumulated text. In some embodiments, this analysis may include filtering the accumulated text. In one embodiment, the accumulated text is filtered with a name list (e.g., list of famous persons, celebrities, etc.). In alternate embodiments, the name of the entity is determined using statistical analysis techniques, machine learning techniques, artificial intelligence techniques, or the like.

In one embodiment, the method may include extracting terms and/or phrases from the accumulated text to determine the name of the entity or to gather associated information. For example, the extracted terms and/or phrases may indicate the gender of the person if the text includes particular key words (e.g., he, she, his, hers, etc.). The text may also indicate the birth date of the person, the occupation, and the like. In one embodiment, the terms and/or phrases may be filtered with a defined list to determine the name and/or information. In another embodiment, names of persons, profiles, and the like may be extracted from the terms and/or phrases by application of profile schemas, ontologies, knowledge bases, and the like.

At block 412, the determined name (such as name 110) may be associated to the query image and output to one or more users. In one embodiment, the name is output as part of a large-scale person profile database (such as database 302). For example, the person profile database may include an image of the person (or other entity), and information about the person, such as: the name of the person, gender, occupation, birth date, etc. Thus, the name and the additional information may be associated to the image of the person (or entity). In alternate embodiments, the output may be in various electronic or hard-copy forms. For example, in one embodiment, the output is a searchable, annotated person profile database that includes classifications for ease of browsing, searching, and the like.

Conclusion

Although implementations have been described in language specific to structural features and/or methodological acts, it is to be understood that the subject matter defined in the appended claims is not necessarily limited to the specific features or acts described above. Rather, the specific features and acts are disclosed as illustrative forms of illustrative implementations. For example, the methodological acts need not be performed in the order or combinations described herein, and may be performed in any combination of one or more acts.

The invention claimed is:

1. A system for automatically identifying a name of a person in an image, the system comprising:
   a processor;
   memory coupled to the processor;
   an analysis component stored in the memory and operable on the processor to:
      receive a query including a face image,
      detect visual features from the face image,
      collect visually similar images based on the detecting,
      accumulate text from documents containing the visually similar images, the text in a proximity of the visually similar images,
      determine a name of a person from the accumulated text; and
   an output component stored in the memory and operable on the processor to output the name of the person.

2. The system of claim 1, wherein the visually similar images are collected from the Internet.

3. The system of claim 1, wherein the analysis component is configured to compute a correlation between a name in the accumulated text and the face image.

4. The system of claim 1, wherein the output component is configured to output a database of person images, the person images annotated with information extracted from the accumulated text, the information including at least one of a name of the person, a birth date of the person, a gender of the person, and an occupation of the person.

5. The system of claim 4, wherein the system is configured to perform face recognition using a non-parametric face recognition engine based on instance search in the annotated database of person images.

6. One or more computer readable storage devices comprising computer executable instructions that, when executed by a computer processor, direct the computer processor to perform operations including:
   receiving a query including an image;
   automatically collecting at least one visually similar image to the included image and text from a file containing the visually similar image, the text being in a proximity of the visually similar image within the file;
   determining a name of an entity in the included image based on the collecting; and
   outputting the name of the entity.

7. The one or more computer readable storage devices of claim 6, wherein the image is a face image and the entity is a person.

8. The one or more computer readable storage devices of claim 7, further comprising filtering the accumulated text to obtain candidate names of the person.

9. The one or more computer readable storage devices of claim 7, further comprising training a binary classification model with a support vector machine (SVM), wherein the candidate name is determined based on a binary classifier.

10. The one or more computer readable storage devices of claim 6, further comprising detecting at least one visual feature from the image.

11. The one or more computer readable storage devices of claim 6, further comprising accumulating text from a proximity of the at least one visually similar image, wherein the name of the entity is determined based on the accumulated text.

12. The one or more computer readable storage devices of claim 6, further comprising computing a correlation between a name in the accumulated text and the included image.

13. The one or more computer readable storage devices of claim 6, further comprising performing multiple searches for visually similar images to the included image and aggregating accumulated text from searches that result in duplicate visually similar images.

14. The one or more computer readable storage media of claim 6, further comprising determining the name of the entity based on an algorithm comprising the equation:

$$v(t_q) = f(\vec{W}, \vec{X}_q)$$

wherein v is a probability that a candidate name $t_q$ is the name of the entity in the included image, $\vec{W}$ are model parameters that are learned from training data, and $\vec{X}_q$ represents a feature vector corresponding to the candidate name $t_q$.

15. The one or more computer readable storage devices of claim 6, wherein the determining the name of the entity in the included image is based at least on a probability that a candidate name is the name of the entity in the included image equivalent to a function of a vector of the name of the entity in the included image, based on model parameters that are learned from training data, and a feature vector corresponding to the candidate name.

16. A computer implemented method of identifying a name of a person in an image, the method comprising:
   receiving a query including a face image;
   detecting at least one visual feature from the face image;
   collecting at least one visually similar image to the face image, based on the detecting;
   accumulating text from at least one document containing the at least one visually similar image, the text in a proximity of the at least one visually similar image;
   determining a name of a person from the accumulated text; and
   outputting the name of the person.

17. The method of claim 16, further comprising extracting terms and/or phrases from the accumulated text and filtering the terms or phrases with a predefined list.

18. The method of claim 16, further comprising outputting a database of person images, the person images annotated with information extracted from the accumulated text, the information including at least one of a name of the person, a birth date of the person, a gender of the person, and an occupation of the person.

19. The method of claim 16, further comprising determining the name Of the person based on the equation:

$$t^* = \underset{t}{\operatorname{argmax}} \sum_i p(t \mid I_i) p(I_i \mid I_q)$$

wherein $I_q$ is the face image, $I_i$ is an i-th visually similar image to the face image, t is a candidate name of the person, $p(I_i|I_q)$ measures a visual similarity between $I_i$ and $I_q$, and $p(t|I_i)$ measures a correlation between t and $I_i$.

20. The method of claim 16 wherein the determining the name of the person represented by the face image from the accumulated text based on an optimization for each candidate name is based at least on a visual similarity between the face image and a candidate image and a correlation between each candidate name and candidate image.

\* \* \* \* \*